Patented Feb. 12, 1924.

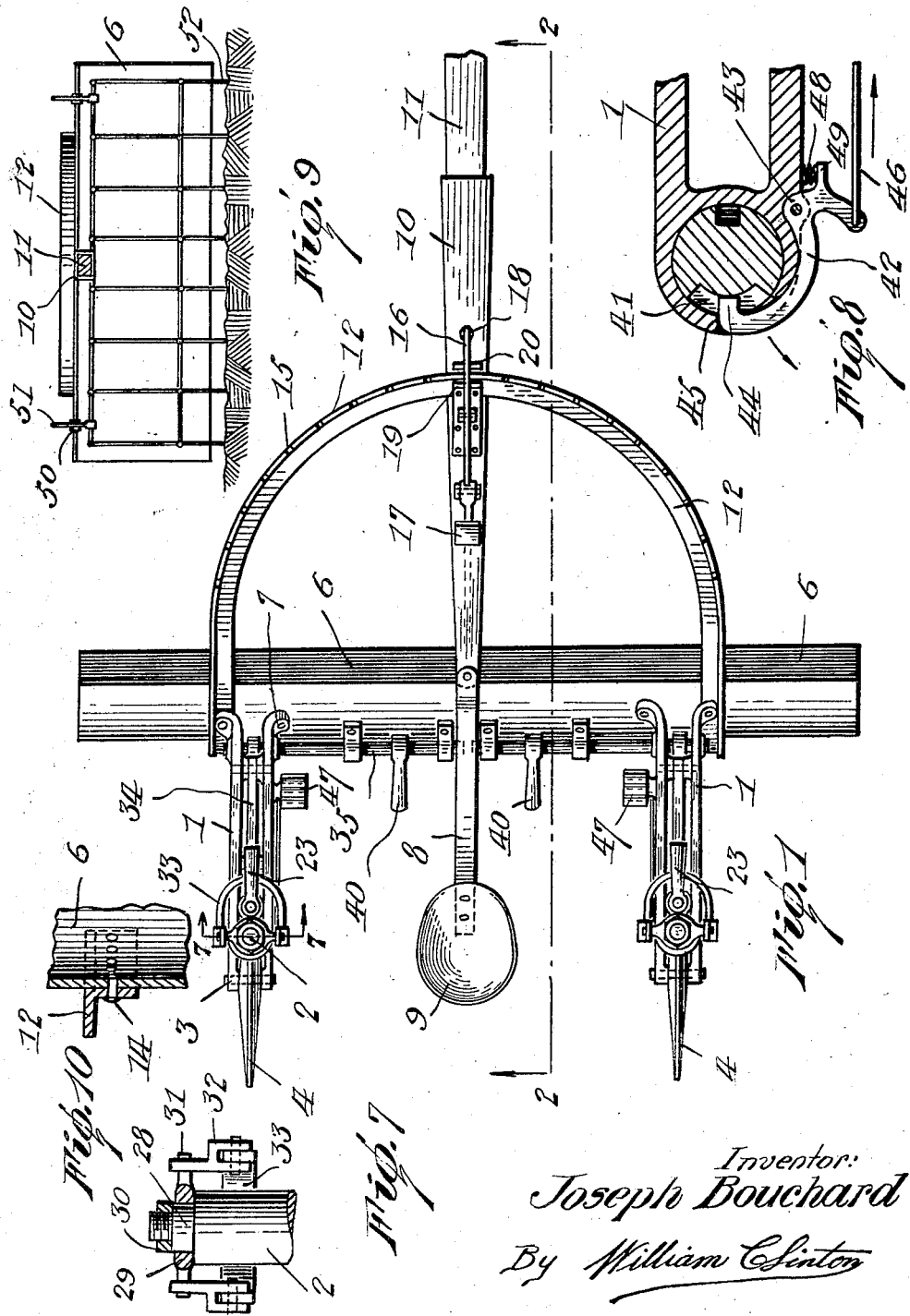

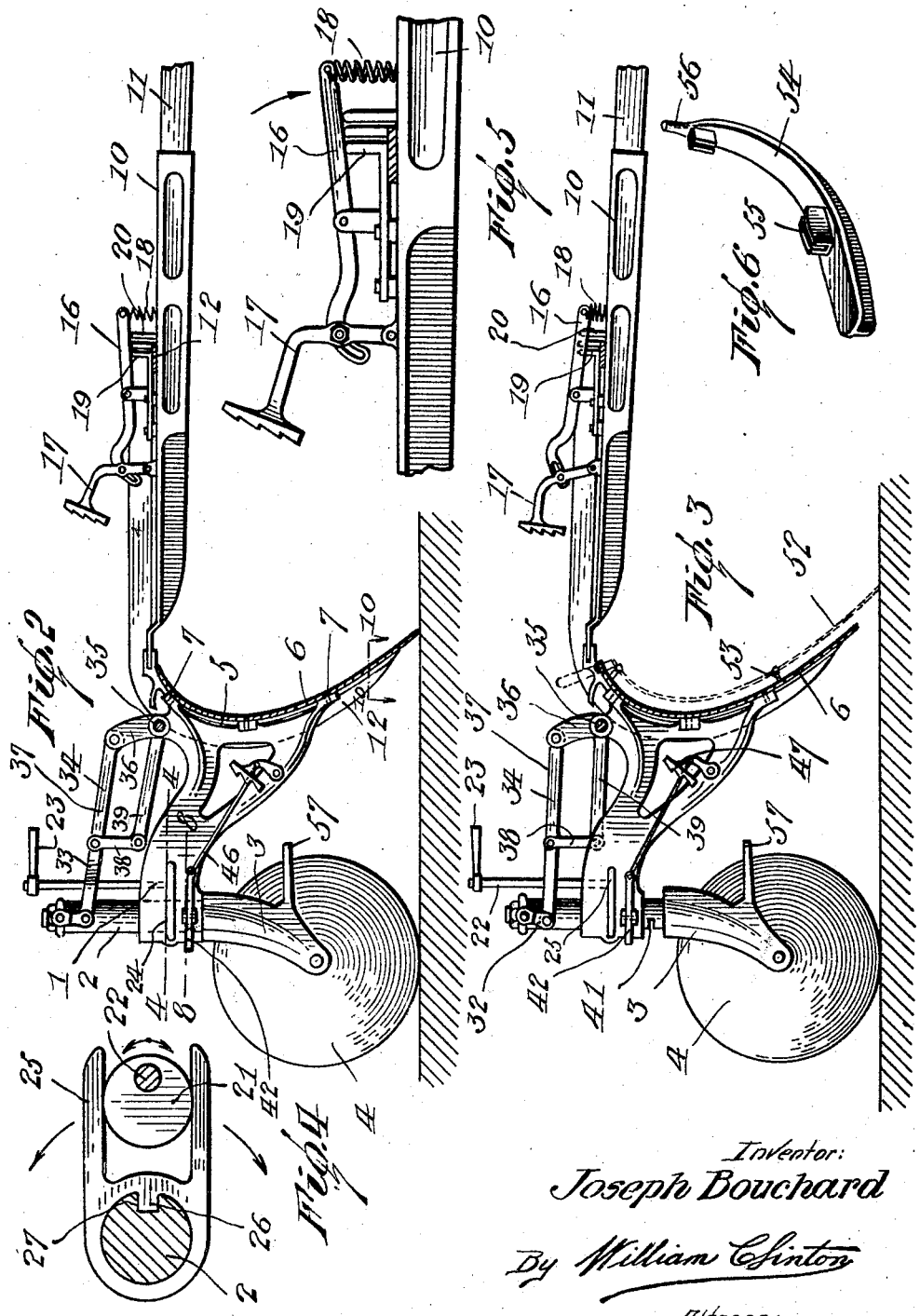

1,483,771

UNITED STATES PATENT OFFICE.

JOSEPH BOUCHARD, OF LACHINE, QUEBEC, CANADA.

PLOW.

Application filed November 25, 1922. Serial No. 603,285.

*To all whom it may concern:*

Be it known that I, JOSEPH BOUCHARD, a subject of the King of Great Britain, residing at Lachine, Province of Quebec, Canada, have invented certain new and useful Improvements in Plows; and I do hereby declare that the following is a full, clear, and exact description of the invention, such as will enable others skilled in the art to which it appertains to make and use the same.

The present invention pertains to a plow and particularly one designed for work upon roads and tracks of various widths. The plow which is a blade or scraper extending in a straight line across the track is adapted for rotation with respect to the frame of the machine, whereby the width of the space actually cleared may be regulated.

The invention is fully disclosed in the following description and in the accompanying drawings in which:

Figure 1 is a plan view of the device;

Figure 2 is a section on the line 2—2 of Figure 1;

Figure 3 is a similar view showing the scraper in inoperative position;

Figure 4 is a section on the line 4—4 of Figure 2;

Figure 5 is a detail view of the adjusting mechanism;

Figure 6 is a perspective view of the shoe;

Figure 7 is a fragmentary section partly in elevation of the upper end of one of the posts on the line 7—7 of Figure 1;

Figure 8 is a section on the line 8—8 of Figure 2;

Figure 9 is a front elevation of the guard frame applied to the scraper; and,

Figure 10 is a section on the line 10—10 of Figure 2.

As shown in Figure 1, the frame of the device includes a pair of side or body members 1 through each of which is passed a vertical post or bolt 2. To the lower end of each post is fixed a sleeve 3 in which a ground wheel 4 is journalled. The forward ends of the side members are concaved, as indicated by the numeral 5 in Figure 2, and have secured thereto a snow scraper or blade 6 by means of fastening devices 7. An arm 8 is pivoted to the upper surface of the blade intermediate its ends and carries a seat 9 disposed between the side members 1. At the same point on the blade is pivoted a bar 10 which telescopically receives a draft tongue 11 to the free end of which is attached the usual harness or the like (not shown). On the top of the blade is also mounted a semi-circular adjustment member 12 the central portion of which rests on the bar 10, as shown in Figures 1 and 2. This member is constructed of angle iron and has its ends curved downwardly to engage the back of the scraper 6 and are riveted thereto, as indicated by the numeral 14 in Figure 10. The vertical side of the angular member is notched as at 15 for the reception of a locking lever 16 which is pivoted on the top of the bar 10. This lever is operable from a foot pedal 17 within the reach of the operator when he is positioned on the seat 9. The forward end of the lever is connected to the bar by means of a spring 18 by means of which it is held in registration with one of the notches 15. On the top of the bar 10 at opposite sides of the member 12 are mounted guide members 19 and 20 for keeping the lever in proper alignment.

When the scraper is in the position shown in Figure 1, the machine will clear the maximum width. In the event that the operator desires that a smaller width be cleared, he causes the entire machine to be turned so as to give the desired angularity to the scraper with respect to the road, upon which the width of the area directly beneath the scraper depends. The operator then releases the lever 16 from the adjustment member and causes the bar 10 to be turned again in alignment with the road. He then releases the pedal 17 to allow the locking lever again to drop into the notch 15 over which it is now positioned.

The side members 1 being secured to the scraper as shown in Figure 1, will carry the wheels 4 to planes perpendicular to that of the blade. It is therefore necessary that the wheels be turned back into parallelism with the bar 10, and for this purpose there is disposed in each side member adjacent the post 2 a disc 21 eccentrically mounted on a shaft 22 equipped at its upper end with a handle 23. The sides of each body member are slotted as at 24 and in these slots is fitted a fork 25 which straddles the disc and which is keyed to the post by means of a lug 26 received in a groove 27 formed longitudinally of the post. Upon rotation of the shaft 22, the fork is moved in one direction or the other carrying with it the post 2 and wheel 4.

The upper end of each post is reduced as at 28 and fitted with a rotatable collar 29 which is held against upward movement by means of a nut 30. On the collar is formed a pair of lugs 31 from which depend the ears 32, the latter receiving the branches 33 of a forked lever 34.

A shaft 35 is passed through the forward upper corner of each body member, and upstanding lugs 36 are formed on the body members adjacent the shaft. The body 37 of each lever 34 is pivoted to one of the lugs 36, as shown in Figures 2 and 3. A short link 38 is pivotally suspended from each lever at the point of intersection of the forked brackets, the lower end of this link being pivoted to a longer link 39, the forward end of which is keyed to the shaft 35. On the shaft is fixed a pair of handles 40 within the reach of the driver's seat and normally pointing forwardly. An upward pull on the handles 40 tends to pull the links 38 and levers 34 downwardly, but such movement is not possible because of the arms 33 being joined to the upper ends of the posts 2 which are immovable vertically. Moreover, the forward end 11 of the machine is also similarly immovable, being secured to the draft animals, the scraper 6 and side members 1 being the only vertically movable parts. Since the lever 34 cannot follow its tendency to move downwardly, continued pull on the handles 40 causes the side members and the blade to rise to the position shown in Figure 3. Thus the blade or scraper is raised from the ground together with the side members, and the latter can be locked in adjusted positions in notches 41 formed in the post for various depths of plowing.

The locking device comprises a bell crank lever 42 (Fig. 8) pivoted between ears 43 formed on each side member, one end of the lever being provided with a tooth 44 engageable in the notches 41 through a slot 45 formed through the body member. The other end of the bell crank lever is connected by means of a link 46 to a foot pedal 47 mounted on the side member and by means of which the lever is operable. The lever is normally held in locking position by means of a spring 48 bearing against the body member and the lug 49.

On the upper edge of the blade is secured a pair of bearing members 50 in which are rotatably mounted handles 51. The latter serve to support a frame 52 disposed in advance of the blade for spreading stones or the like on the road. At various points on the frame are provided studs 53 engaging the blade and holding the frame in spaced relation therefrom. The frame may be adjusted vertically with respect to the ground by means of the rotatable handles 51.

In Figure 6 is shown an arcuate shoe 54 the inner surface of which is provided with a pair of guides 55 for receiving the edge of the wheel 4. The upper end of the shoe is reduced and lined as at 56 for the reception within an ear 57 formed integral with each of the sleeves 3. Thus the machine may be made to travel over the ground as a sled.

While a specific embodiment of the invention has been illustrated and described, it is to be understood that various alterations in the details of construction may be made without departing from the spirit of the invention, as indicated by the appended claim.

Having thus fully described the invention, what I claim as new and desire to protect by Letters Patent is:—

A plow comprising a body portion, a post rotatably carried thereby, a wheel journaled in said post, a fork secured to the post, a disk mounted within the fork and engaging the sides thereof, a shaft eccentrically fixed to the disk, a handle for turning the shaft, a scraper secured to said body portion, a curved member mounted on said scraper and fixed thereto, a draft element pivoted to the scraper, and means for adjustably engaging said element with the curved member.

In witness whereof I have hereunto set my hand.

JOSEPH BOUCHARD.